(No Model.)
W. DUNN.
NUT LOCK.
No. 382,078. Patented May 1, 1888.
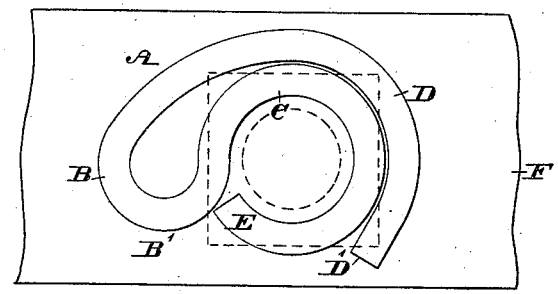
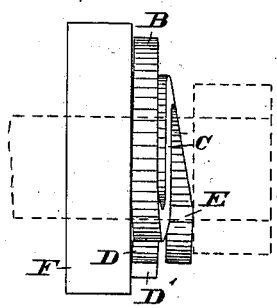
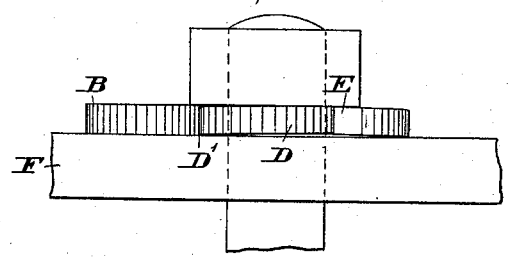
WITNESSES:
Th. Rolle.
A. P. Grant.
INVENTOR:
Wm. Dunn
BY John A. Diedersheim
ATTORNEY.

UNITED STATES PATENT OFFICE.

WILLIAM DUNN, OF PHILADELPHIA, PENNSYLVANIA, ASSIGNOR OF TWO-THIRDS TO DANIEL B. RUFFNER AND GIDEON S. BOLTON, OF SAME PLACE.

NUT-LOCK.

SPECIFICATION forming part of Letters Patent No. 382,078, dated May 1, 1888.

Application filed March 19, 1887. Serial No. 231,551. (No model.)

*To all whom it may concern:*

Be it known that I, WILLIAM DUNN, a citizen of the United States, residing in the city and county of Philadelphia, State of Pennsylvania, have invented a new and useful Improvement in Nut-Fasteners, which improvement is fully set forth in the following specification and accompanying drawings, in which—

Figure 1 represents a front view of a nut-fastener embodying my invention. Fig. 2 represents a side elevation thereof, taken from the left of Fig. 1. Fig. 3 represents a side elevation thereof, illustrating the action of the nut-fastener.

Similar letters of reference indicate corresponding parts in the several figures.

My invention consists of a nut-fastener formed of a compound or double-acting spring, as will be hereinafter fully set forth.

Referring to the drawings, A represents a nut-fastener, same being formed of a bar or piece of metal, preferably steel, the same being bent, as at B, and having one end formed into an eye, C. The other end, D, of the bar is bent around the eye C, which receives the bolt of the nut to be fastened, the said end portion, D, forming a reliable seat for the spring portions, so that the same when pressed inward are not pushed or forced sidewise, but are pressed in the axial direction of the device or in the line of the bolt. The eye C is thrown out or raised above the end portion, D, forming a spring, and the end E of said eye is also set out from the adjacent portion of the eye C, so as to be salient.

It will be seen that when the fastener is in position and the nut screwed on the bolt said nut tightens against the fastener and first compresses the end portion, E, of the eye C, and next said eye C itself, which, as has been stated, including the portion B', which rises from the bend B and joins the eye C, are set out from the remaining portion of the fastener, said portion B' also constituting a spring, so that there is a pressure of a double spring on the nut, whereby unscrewing of the nut is prevented, the fastening of the nut being also assured by the biting action of the salient end of the eye C against the nut. As the spring is firmly compressed against the fish-plate or back plate, F, rotation of the spring on said plate is also prevented, this being assured by the biting action of the end D' of the portion D, which is in contact with said plate F, said portion D being bent slightly outward, as shown in Fig. 3, so as to be elastic in its nature, whereby the end D' is forcibly compressed against the back plate when the nut is tightened.

By the present construction an effective, reliable, strong, and durable nut-fastener is produced.

I am aware that spring-fasteners in nut-locks are old; but I am not aware that it is new to form a device, as herein described, wherein one end of a strip of the material is bent in the form of an eye, and the other end is so bent as to partially encircle the said eye, forming a seat therefor, as described.

Having thus described my invention, what I claim as new, and desire to secure by Letters Patent, is—

A nut-fastener consisting of a single strip of material having one end coiled, forming a spring and an eye, C, and the other end portion, D, bent around the said eye C, and having a spring portion, B', adjacent to the said eye, and the ends E and D' being set out in opposite directions, all as described.

WILLIAM DUNN.

Witnesses:
JOHN A. WIEDERSHEIM,
JAS. F. KELLY.